United States Patent [19]
Nishii et al.

[11] Patent Number: 5,470,617
[45] Date of Patent: Nov. 28, 1995

[54] PROCESS FOR MODIFYING THE SURFACES OF THE MOLDED MATERIALS MADE OF FLUORINE RESINS

[75] Inventors: Masanobu Nishii, Kyoto; Yuichi Shimizu, Osaka; Shunichi Kawanishi, Osaka; Shunichi Sugimoto, Osaka; Masao Endo, Nishinomiya; Tomohiro Nagase, Osaka, all of Japan

[73] Assignee: Kurashishiki Boseki Kabushiki Kaisha, Kurashiki, Japan

[21] Appl. No.: 322,484

[22] Filed: Oct. 14, 1994

[30] Foreign Application Priority Data

Oct. 15, 1993 [JP] Japan ................................ 5-258087

[51] Int. Cl.⁶ ........................................................ B05D 3/06
[52] U.S. Cl. .................... 427/521; 427/393.5; 427/554; 427/558; 427/559; 427/581; 427/596
[58] Field of Search ...................................... 427/554, 558, 427/596, 393.5, 444, 521, 581

[56] References Cited

FOREIGN PATENT DOCUMENTS

| | | |
|---|---|---|
| 53-22108 | 7/1978 | Japan . |
| 58-21928 | 5/1983 | Japan . |
| 2-127442 | 5/1990 | Japan . |
| 2-196834 | 8/1990 | Japan . |
| 3-57143 | 8/1991 | Japan . |
| 3-58375 | 9/1991 | Japan . |
| 4-370123 | 12/1992 | Japan . |
| 5-125208 | 5/1993 | Japan . |

OTHER PUBLICATIONS

Nelson, Edward, T. J. Kilduff, and A. A. Benderly, "Bonding of Teflon", *Industrial and Engineering Chemistry*, vol. 50, No. 3, 1958 (Mar.), pp. 329–330 (no month available).

Kogyo Zairyo, *Engineering Material*, vol. 29, No. 2, 1981, pp. 105–113. (no month available).

*Primary Examiner*—Bernard Pianalto
*Attorney, Agent, or Firm*—Foley & Lardner

[57] ABSTRACT

The present invention relates to a process for modifying the surfaces of the molded materials made of fluorine resins comprising irradiating an ultraviolet laser beam on said surfaces in the presence of an ultraviolet-absorbing compound and a fluorosurfactant. According to the process, the adhesive and wetting properties and the like of the surfaces of the molded materials made of fluorine resins can be remarkably improved.

7 Claims, No Drawings

PROCESS FOR MODIFYING THE SURFACES OF THE MOLDED MATERIALS MADE OF FLUORINE RESINS

FIELD OF THE INVENTION

The present invention relates to an improved process for modifying the chemically inactive surfaces of the molded materials made of fluorine resins which increases the adhesive and wetting properties of said surfaces.

BACKGROUND OF THE INVENTION

Fluorine resins are fit for various uses because they have superior properties (e.g. oil and water repellency, sliding property, stain resistance, heat resistance, chemical resistance and electrical properties) in comparison with other resins. However the fluorine resins have disadvantages that it is difficult to apply adhesives, coatings and the like to the fluorine resins or to laminate the fluorine resins with other materials, said disadvantages being attributable to the inactive surface of the fluorine resins.

Various processes for modifying the surfaces of the fluorine resins have hitherto been proposed. For example, E. R. Nelson et. al. (Ind. Eng. Chem., vol. 50, 1958, pp. 329–330) describe the use of a complex solution prepared from a tetrahydrofuran solution of metallic sodium and naphthalene. In this technique, not only it causes trouble from the viewpoint of working hygiene because the complex solution is unstable and liable to cause ignition during the treatment of the fluorine resins, but also adhesive and wetting properties and the like of the modified surfaces of the fluorine resins decrease remarkably under the condition of sunlight exposure or high temperature.

Tsunoda et. al. [*Kogyo Zairyo* (Engineering Materials), vol. 29 (No. 2), 1981, p. 105] describe the use of a glow discharge. In this technique, a modification effect of the surfaces of the fluorine resins is remarkably inferior to that of nonfluorine resins such as polyethylene and the like.

Japanese Patent Publication (KOKOKU) No. 22108/1978 describes the use of a high frequency sputter etching under low pressure. In this method, there are several disadvantages that (i) a treating speed is slow, (ii) resinous residues formed during the sputter etching are deposited to inner parts of an expensive, large-sized treating apparatus with a vacuum system, and (iii) an abrasionable, irregular surfaces of the fluorine resins do not bring about sufficient adhesive properties and application properties of coatings for low fluidable adhesives, coatings and the like.

Japanese Patent Publication(KOKAI) No. 196834/1990 describes the use of laser beam in a special gaseous atmosphere such as $B(CH_3)_3$ and $Al(CH_3)_3$. According to this method, a treating speed is slow, and a strong poisonous gas and an expensive, large-sized treating apparatus are inevitably required.

Japanese Patent Publication (KOKOKU) No. 57143/1991 describes the use of excimer laser beam, said laser beam being directly irradiated to the fluorine resins. According to this technique, adhesive and wetting properties of the surfaces of the fluorine resins cannot sufficiently be improved.

Japanese Patent Publications No. 21928/1983 (KOKOKU), No. 127442/1990 (KOKAI) and No. 58375/1991 (KOKOKU) describe the use of plasma sputter etching at low temperature. In this method, it is difficult to obtain high adhesive strength because of the chemical composition of the treated surfaces of the fluorine resins. In order to achieve the same higher adhesive strength as that obtained according to the method by Nelson et al., the surfaces of the fluorine resins must be treated for long-time under the narrow treating condition. Therefore said method is insufficient as an industrial treating technique.

Japanese Patent Publication (KOKAI) No. 125208/1993 discloses the method wherein ultraviolet laser beam is irradiated on the fluorine resins with which light-absorbing materials are kneaded previously. However this method cannot be applied to a surface modification of ready-made molded articles made of fluorine resins because the laser beam must be irradiated after a light-absorbing material is kneaded in the fluorine resins.

SUMMARY OF THE INVENTION

The object of the present invention is to solve the aforesaid problems of the former proposed processes for modifying the surfaces of the fluorine resins, and to provide an improved process for modifying the surfaces of the molded materials made of the fluorine resins which remarkably increases the adhesive and wetting properties and the like of said surfaces, said improved process being generally applied to the surface modification of the molded materials made of fluorine resins.

Accordingly the present invention relates to a process for modifying the surfaces of the molded materials made of fluorine resins comprising irradiating an ultraviolet laser beam on said surfaces in the presence of an ultraviolet-absorbing compound and a fluorosurfactant.

DETAILED DESCRIPTION OF THE INVENTION

Any molded material made of any organic polymer containing fluorine atoms may be used in the above process. Following resins are exemplified as preferred basic fluorine resins: polytetrafluoroethylene (PTFE), copolymer of tetrafluoroethylene with perfluoroalkoxyethylene (PFA), copolymer of tetrafluoroethylene with hexafluoropropylene (FEP), terpolymer of tetrafluoroethylene with hexafluoropropylene and perfluoroalkoxyethylene (EPE), copolymer of tetrafluoroethylene with ethylene(ETFE), polychlorotrifluoroethylene (PCTFE), copolymer of trifluorochloroethylene with ethylene (ECTFE), polyvinylidene fluoride (PVDF) and polyvinyl fluoride (PVF). Any molded material made of any mixture of the aforesaid fluorine resins may be employed in the above process.

Although concrete shapes or forms of the molded materials to be treated by the process according to the present invention are not limited, molded articles having any figure, such as sheets, films, pipes, porous membranes and the like are exemplified.

Although the well-known ultraviolet-absorbing compounds may be employed suitably in the present invention, aromatic ultraviolet-absorbing compounds, such as aromatic hydrocarbons, aromatic carboxylic acids and the salts thereof, aromatic aldehydes, aromatic amines and the salts thereof, aromatic sulfonic acids and the salts thereof, phenols and the like are preferred.

The following aromatic compounds are exemplified as the aromatic ultraviolet-absorbing compounds: naphthalene, phenanthrene, anthracene, naphthacene, biphenyl, sodium benzoate, phthalic acid, benzaldehyde, benzyl alcohol, phenyl ethanol, benzenesulfonic acid, 2-naphthalenesulfonic acid, anthraquinone-2-sodium sulfonate, phenol, cresol, 2,4-dihydroxy benzophenone, 2-hydroxy-4-methoxybenzophenone, 2-hydroxy-4-n-octhoxybenzophenone, 4-dodecyloxy-2-hydroxy benzophenone, 2-hydroxy-4-octadecyloxybenzophenone, 2,2'-dihydroxy-4-methoxybenzophenone, 2,2'-dihydroxy-4,4'-dimethoxybenzophenone, 2,2',4,4'-tetrahydroxybenzophenone, 2-hydroxy-4-methoxy-5-sulfobenzophenone, 2-hydroxy-4-methoxy-2-carboxybenzophenone, 2'-hydroxy-4-chlorobenzophenone, 2(2'-hydroxy-5-methoxyphenyl)benzotriazole, 2(2'-hydroxy- 3',5'-di-t-butylphenyl)benzotriazole, 2(2'-hydroxy-3'-t-butyl-5'-metylphenyl)benzotriazole, phenyl salicylate, poctylphenyl salicylate, p-t-butylphenyl salicylate, carboxyphenyl salicylate, strontium salicylate, methyl salicylate, dodecyl salicylate, resorcinol monobenzoate, 2-ethylhexyl-2-cyano-3,3-diphenyl acrylate, 2-ethyl- 2-cyano-3,3-diphenyl acrylate, Ni-bisoctylphenyl sulfide, and [2,2'-thiobis(4-t-octylphenolato)]-n-butyamine-Ni.

The well-known surfactants having hydrophobic fluorocarbon chains may be used as the fluorosurfactant in the present invention. The following fluorosurfactants (1)–(4) are exemplified.

(1) Anionic fluorosurfactants $$RfCOOM$$

$$RfSO_2N(R)_2CH_2COOM$$

$$RfCONRYOSO_3M$$

$$RfSO_2NRYOSO_3M$$

$$RfSO_3M$$

$$RfCH_2O(CH_2)_2SO_3M$$

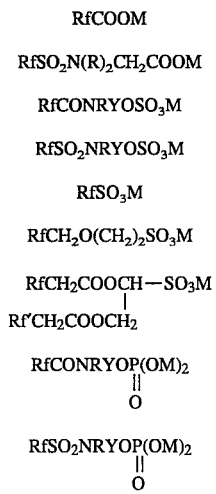

$$RfCONRYOP(OM)_2$$
$$\quad\quad\quad\quad \|$$
$$\quad\quad\quad\quad O$$

$$RfSO_2NRYOP(OM)_2$$
$$\quad\quad\quad\quad\; \|$$
$$\quad\quad\quad\quad\; O$$

In the above formulae, Rf and Rf' denote fluoroalkyl groups, R denotes hydrogen atom or lower alkyl group, Y denotes lower alkylene group, and M is hydrogen atom, -NH$_4$, alkali metal atom or alkaline earth metal atom.

(2) Cationic fluorosurfactants $$RfCONHYN(R)(R').HX$$

$$RfSO_2NHYN(R)(R').HX$$

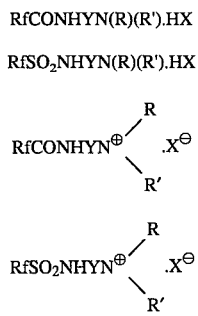

In the above formulae, Rf, R and Y have the same meanings as aforementioned, R' denotes hydrogen atom or lower alkyl group, HX denotes acid, and X denotes halogen atom or acid radical.

(3) Ampholytic fluorosurfactants $$RfCONHYN^{\oplus}(R)_2(CH_2)_2COO^{\ominus}$$

$$RfSO_2NHYN^{\oplus}(R)_2(CH_2)_2COO^{\ominus}$$

In the above formulae, Rf, R and Y have the same meanings as aforementioned.

(4) Nonionic fluorosurfactants $$RfOH$$

$$\begin{array}{c} R \\ | \\ RfCON(C_2H_4O)_nH \end{array}$$

$$\begin{array}{c} R \\ | \\ RfSO_2N(C_2H_4O)_nH \end{array}$$

$$Rf-O-(CH_2-CH_2-O)_n-H$$

$$Rf-COO-CH_2-CH_2-OOC-Rf$$

In the above formulae, Rf and R have the same meanings as aforementioned, n is a number of from 1 to 30.

Mixtures of two or more of the exemplified fluorosurfactants may be employed as the occasion may demand.

As the preferable, commercially available fluorosurfactants, the following compounds which can be available from Asahi Glass Company are exemplified: SURFLON S-111 (perfluoroalkylphosphate), SURFLON S-113 (perfluoroalkylcarboxylate), SURFLON S-121 (perfluoroalkyl trimethylammonium salt), SURFLON S-131 (perfluoroalkylbetaine), SURFLON S-132 (perfluoroalkylbetaine), SURFLON S-141 (perfluoroalkylamine oxide), SURFLON S-145 (perfluoroalkyl ethylene oxide adduct) and the like.

An existential embodiment of the ultraviolet-absorbing compounds and the fluorosurfactants on the surfaces of the molded materials made of fluorine resins is not limited. Liquid and/or powdery ultraviolet-absorbing compound and fluorosurfactant may be directly spreaded on the surfaces of the molded materials made of fluorine resins. However, from the viewpoint of modification efficiency of said surfaces, workability and the like, it is preferable to contact an aqueous or water-soluble organic solvent solution, dispersion or suspension of the ultraviolet-absorbing compounds and fluorosurfactants with said surfaces. As the solvent of said solution and the like, mixtures of water and water-soluble organic solvents, such as lower alcohols (e.g., methanol, ethanol, isopropanol and butanol) may be employed. In the case of the aqueous solution, water-soluble organic solvents may be added in order to increase the solubilities of the ultraviolet-absorbing compounds and fluorosurfactants.

Concentration of the aqueous or water-soluble organic solvent solution and the like of the ultraviolet-absorbing compounds is under the control of the kinds of the ultraviolet-absorbing compounds, the fluorine resins to be treated and the fluorosurfactants, and the solubilities of the ultraviolet-absorbing compounds in water or water-soluble organic solvents, said concentration being not limited. In general, the concentration of the ultraviolet-absorbing compounds is 0.05–10 percent by weight, preferably 0.1–5 percent by weight.

Concentration of the fluorosurfactants is so selected that sufficient amounts of the ultraviolet-absorbing compounds are coated uniformly on the surfaces of the molded materials made of fluorine resins. In general, the concentration of the fluorosurfactants is 0.05–2 percent by weight, preferably 0.1–1 percent by weight.

Coating, spraying and immersing methods may be used to contact the aqueous or organic solvent solution and the like of the ultraviolet-absorbing compounds and the fluorosurfactants with the surfaces of the molded materials made of fluorine resins. Drying process may be employed after contacting said solution and the like with said surfaces. The drying process may be carried out by air-drying or heat-drying at, for example, 60°–150° C. Owing to the function of the fluorosurfactants, sufficient amounts of the ultraviolet-absorbing compounds are uniformly coated on the surfaces of the fluorine resins.

In the present invention, the surfaces of the molded materials made of fluorine resins can be modified by irradiating the ultraviolet laser beam on said surfaces under the condition that the ultraviolet-absorbing compounds and the fluorosurfactants contact with said surfaces. The ultraviolet laser beams having a wavelength of less than 400 nm are preferred. As the ultraviolet laser beam, argon laser beam, krypton ion laser beam, Nd:YAG laser beam, $N_2$ laser beam, color laser beam, excimer laser beam and the like are exemplified, the excimer laser beam having a wavelength of from 193 nm to 308 nm being preferred. In particular, KrF-excimer laser beam (wavelength: 248 nm), ArF-excimer laser beam (wavelength: 193 nm) and XeCl-excimer laser beam (wavelength: 308 nm) are preferable because they are produced in a stable high-output for a long-time. The ultraviolet laser beam may usually be irradiated under atmospheric conditions, but an oxygen atmosphere may be employed for the irradiation of said laser beam. The irradiation conditions of the ultraviolet laser beam may be influenced by the kinds of the fluorine resins, the ultraviolet-absorbing compounds and the fluorosurfactants as well as the desired modification degree of the surfaces of the molded materials made of fluorine resins. In general, in the case of excimer laser beam, a fluence is more than about 50 $mJ/cm^2$/pulse, an incident energy is more than about 0.1 $J/cm^2$, and a shot number is less than about 100.

The commonly used irradiation conditions of the particularly preferred excimer laser beams, such as KrF-, ArF- and XeCl-excimer laser beams are as follows:

KrF

Fluence; 100–500 $mJ/cm^2$/pulse

Incident energy; 0.2–2.0 $J/cm^2$

Shot number; 1–20

ArF

Fluence; 50–150 $mJ/cm^2$/pulse

Incident energy; 0.1–1.0 $J/cm^2$

Shot number; 1–20

XeCl

Fluence; 100–600 $mJ/cm^2$/pulse

Incident energy; 0.1–2.0 $J/cm^2$

Shot number; 1–20

According to the present invention, the chemically inactive surfaces of the fluorine resins can be effectively modified without deteriorating the characteristics of the fluorine resins such as the heat resistance, the chemical resistance, electrical properties and the like. The surface modification produces the remarkable improvements in the wetting properties, the adhesive properties, the printability, the application properties of coatings. Therefore the added values of the molded articles and the like made of the fluorine resins whose surfaces are modified by the present invention increase rapidly because said molded articles and the like can be subjected to the secondary processings such as various printing and application treatments, lamination with other resins or inorganic materials, and so forth.

EXAMPLES

Example 1

The aqueous pretreating liquid was prepared by dissolving 0.05, 0.5 or 1.0 percent by weight of "SURFLON S-113" (solid content: 30 percent by weight, solvent: water/isopropanol) in 1%-aqueous solution of sodium benzoate. The aqueous pretreating liquid was applied to the surfaces of the films (100 μm) made of PFA, FEP or ETFE by means of the applicator (YA-type applicator manufactured by Yoshimitsu Seiki Co., Ltd.). The coating thickness of the aqueous pretreating liquid was 50 μm. After air-drying, ArF-excimer laser beam (wavelength: 193 nm) was irradiated on the surfaces of the films (fluence: 150 $mJ/cm^2$/pulse, shot number: 2).

Peel strength of the modified film at a peel angle of 180° was measured as follows:

The film (30 mm×150 mm×100 μm) and the stainless steel plate SUS 304 (25 mm×150 mm×300 μm) were bonded together with the epoxy resin adhesive which is curable at the normal temperature ("Bond E Set Cleaner" produced by Konishi Co., Ltd.). The pressure of 10 $g/cm^2$ was applied to the laminate at the normal temperature for 20 hours. The peel strength of the film at a peel angle of 180° was determined by peeling the film from the laminate at a speed of 100 mm/min by means of the tensile tester ("Autograph P-100" manufactured by Shimadzu Seisakusho Co., Ltd.).

The results obtained are shown in Table 1.

Comparative example 1

The procedure was the same as for Example 1, except for irradiating ArF-excimer laser beam on the surfaces of the films to which the aqueous pretreating liquid was not applied. The result obtained is shown in Table 1.

The peel strength of the untreated film made of PFA, FEP or ETFE is less than 0.01 Kg/cm which is the critical value for the measurement.

Example 2

The procedure was the same as for Example 1, except for using the aqueous pretreating liquid which contains 1.0 percent by weight of SURFLON S-113 and irradiating KrF-excimer laser beam (wavelength: 248 nm) under the conditions shown in Table 2. The results obtained are shown in Table 2.

Example 3

The procedure was the same as for Example 2, except for substituting 2-naphthalenesulfonic acid, benzenesulfonic acid or anthraquinone-2-sodium sulfonate for sodium benzoate and irradiating KrF-excimer laser beam (fluence: 300 $mJ/cm^2$/pulse, shot number: 2). The results obtained are shown in Table 3.

Example 4

The aqueous pretreating liquid containing 1 percent by weight of SURFLON S-113 and 1%, 5 % or 10 % of sodium benzoate was applied to the surface of the film made of PTFE (300 μm) by means of the applicator. The coating thickness was 25 μm. After air-drying, KrF-excimer laser beam was irradiated on the pretreated surface of the film (fluence: 260 $mJ/cm^2$/pulse, shot number: 4). The peel strength of the modified film was measured according to the method described in Example 1. The results are shown in Table 4.

Example 5

Eighty parts by weight of "Teflon G-190" (PTFE powder which is commercially available from Mitsui Du Pont Florochemical Co., Ltd.) and 20 parts by weight of "PFA-001" (glass fibre which is commercially available from Asahi Glass Co., Ltd.) are mixed together to form a compound. The film (500 μm) to be tested was prepared by molding the compound and then calcining the molded film.

The aqueous pretreating liquid was prepared by dissolving 0.5 percent by weight of "SURFLON S-121" (solid content: 30 percent by weight, solvent: water/isopropanol) or "SURFLON S-132" (solid content: 30 percent by weight, solvent: water/isopropanol) in 1%-aqueous solution of sodium benzoate. The aqueous pretreating liquid was applied to the surface of the film to be tested by means of the applicator (coating thickness: 25 μm). After air-drying, KrF-excimer laser beam was irradiated on the pretreated surface of the film (fluence: 300 mJ/cm$^2$/pulse, shot number: 4). The peel strength of the modified film was measured according to the method described in Example 1. The results obtained are shown in Table 5.

Example 6

The aqueous pretreating liquid was prepared by dissolving 1 percent by weight of "SURFLON S-113" in 1%-aqueous solution of anthraquinone-2-sodium sulfonate. The film made of PFA (100 μm) was immersed in the aqueous pretreating liquid for 1 minute. After air-drying, XeCl-excimer laser beam (wavelength: 308 nm) was irradiated on the pretreated surface of the film (fluence: 500 mJ/cm$^2$/pulse, shot number: 2). The peel strength of the modified film measured according to the method described in Example 1 was 1.3 Kg/cm.

Example 7

The aqueous pretreating liquid was prepared by dissolving 1 percent by weight of "SURFLON S-113" in 1%-aqueous solution of sodium benzoate. Just after application of the aqueous pretreating liquid to the film made of PFA (100 μm) (coating thickness: 50 μm), KrF-excimer laser beam was irradiated on the pretreated surface of the film (fluence: 200 mJ/cm$^2$/pulse, shot number: 3 or 4). The peel strength of the modified film measured according to the method described in Example 1 was 0.4 Kg/cm (shot number: 3) or 0.6 Kg/cm (shot number: 4).

Comparative example 2

The procedure was the same as for Example 7, except for irradiating KrF-excimer laser beam on the surface of the film which was not treated with the aqueous pretreating liquid. The peel strength of the film was less than 0.01 Kg/cm.

Example 8

The alcoholic pretreating liquid was prepared by dissolving 0.1 percent by weight of "Fluorad FC-430" (fluorinated alkyl ester which is commercially available from Sumitomo 3M Co., Ltd.) in 1%-ethyl alcoholic solution of carbazole. Just after application of said pretreating liquid to the film made of PFA (100 μm) (coating thickness: 50 μm), KrF-excimer laser beam was irradiated on the pretreated surface of the film (fluence: 300 mJ/cm$^2$/pulse, shot number: 2). The peel strength of the modified film measured according to the method described in Example 1 was 0.9 Kg/cm.

Example 9

The alcoholic pretreating liquid was prepared by issolving 0.1 percent by weight of "Fluorad FC-430" in 1%-isopropyl alcoholic solution of phenanthrene. Just after application of said pretreating liquid to the film made of PFA (100 μm) (coating thickness: 50 μm), KrF-excimer laser beam was irradiated on the pretreated surface of the film (fluence: 300 mJ/cm$^2$/pulse, shot number: 2). The peel strength of the modified film according to the method described in Example 1 was 1.3 Kg/cm.

Example 10

The procedure was the same as for Example 9, except for substituting p-hydroxy ethyl benzoate for phenanthrene. The peel strength of the film was 0.7 Kg/cm.

Example 11

The aqueous pretreating liquid was prepared by dissolving 0.75 percent by weight of "SURFLON S-113" in 1.0 %-aqueous solution of anthraquinone-2-sodium sulfonate. Just after application of the aqueous pretreating liquid to the PFA film (100 μm) (coating thickness: 25 μm), KrF-excimer laser beam was irradiated on the pretreated surface of the film (fluence: 100 mJ/cm$^2$/pulse, shot number: 9).

The wetting property of the film was measured with a standard solution for a wetting index prepared according to JIS K-6768 specification. The standard solution consists of a series of mixed solutions whose surface tensions vary successively. The mixed solutions were successively applied to the film in an ascending order of the surface tensions. The wetting index of the film was evaluated as the maximum surface tension of the mixed solution which wets the film.

The wetting index of the modified film was 35 dyn/cm.

Comparative example 3

The procedure was the same as for Example 11, except for irradiating KrF-excimer laser beam on the surface of the PFA film which was not treated with the aqueous pretreating liquid. The wetting index of said film determined according to the method described in Example 11 was less than 31 dyne/cm.

Example 12

The alcoholic pretreating liquid was prepared by dissolving 0.1 percent by weight of "Fluorad FC-430" in 0.5 %-isopropyl alcoholic solution of phenanthrene. The alcoholic pretreating liquid was brushed onto the PFA film (100 μm). After air-drying, KrF-excimer laser beam was irradiated on the pretreated surface of the film (fluence: 100 mJ/cm$^2$/pulse, shot number: 4). The wetting index of the modified film determined according to the method described in Example 11 was more than 54 dyne/cm.

TABLE 1

| Concentration of SURFLON S-113 | Peel strength of the film at a peel angle of 180° (Kg/cm) | | |
|---|---|---|---|
| (percent by weight) | PFA | FEP | ETFE |
| Example 1 | | | |

TABLE 1-continued

| Concentration of SURFLON S-113 | Peel strength of the film at a peel angle of 180° (Kg/cm) | | |
|---|---|---|---|
| (percent by weight) | PFA | FEP | ETFE |
| 0.05 | 0.6 | 0.8 | 0.6 |
| 0.5 | 0.8 | 1.0 | 0.9 |
| 1.0 | 1.0 | 1.2 | 1.4 |
| Comparative example 1 | | | |
| — | 0.08 | 0.02 | 0.02 |

TABLE 2

| KrF-excimer laser beam | | Peel strength of the film at a peel angle of 180° (Kg/cm) | | |
|---|---|---|---|---|
| Fluence mJ/cm²/pulse | Shot number | PFA | FEP | ETFE |
| 300 | 2 | 1.28 | 1.5 | 1.2 |
|  | 3 | 1.2 | 1.0 | 1.2 |
|  | 4 | 1.0 | 1.0 | 1.5 |
| 200 | 2 | 1.0 | 0.8 | — |
|  | 3 | 1.0 | 1.0 | — |
|  | 4 | 0.6 | 1.0 | — |

TABLE 3

| Ultraviolet-absorbing compound | Peel strength of the film at a peel angle of 180° (Kg/cm) | | |
|---|---|---|---|
|  | PFA | FEP | ETFE |
| 2-Naphthalenesulfonic acid | 0.8 | 1.2 | 0.6 |
| Benzenesulfonic acid | 0.8 | 0.6 | 0.6 |
| Anthraquinone-2-sodium sulfonate | 1.2 | 0.8 | 1.4 |

TABLE 4

| Concentration of sodium benzoate | Peel strength of the film at a peel angle of 180° (Kg/cm) |
|---|---|
| 1 | 0.72 |
| 5 | 0.72 |
| 10 | 1.04 |

TABLE 5

| Fluorosurfanctant | Peel strength of the film at a peel angle of 180° (Kg/cm) |
|---|---|
| SURFLON S-121 | 1.3 |
| SURFLON S-132 | 1.4 |

What is claimed is:

1. A process for modifying the surfaces of the molded materials made of fluorine resins comprising irradiating an ultraviolet laser beam on said surfaces in the presence of an ultraviolet-absorbing compound and a fluorosurfactant, wherein the fluorosurfactant is present in a concentration that permits uniform coating of the ultraviolet-absorbing compound on the surfaces of the molded material.

2. The process of claim 1 wherein the ultraviolet-absorbing compound is aromatic ultraviolet-absorbing compound.

3. The process of claim 2 wherein the aromatic ultraviolet-absorbing compound is one or more of the compounds selected from the group consisting of aromatic hydrocarbons, aromatic carboxylic acids and the salts thereof, aromatic aldehydes, aromatic alcohols, aromatic amines and the salts thereof, aromatic sulfonic acids and the salts thereof, and phenols.

4. The process of claim 1 wherein the fluorosurfactant is one or more of the fluorocompounds selected from the group consisting of perfluoroalkylphosphate, perfluoroalkylcarboxylate, perfluoroalkyl trimethyl ammonium salt, perfluoroalkylbetaine, perfluoroalkylamine oxide, and perfluoroalkyl ethylene oxide adduct.

5. The process of claim 1 wherein the ultraviolet laser beam in ArF-excimer laser beam, KrF-excimer laser beam or XeCl-excimer laser beam.

6. The process of claim 1 wherein the surfaces of the molded materials made of the fluorine resins are coated with an aqueous solution of the ultraviolet-absorbing compound and the fluorosurfactant.

7. The process of claim 1 wherein the surfaces of the molded materials made of the fluorine resins are coated with a lower alcoholic solution of the ultraviolet-absorbing compound and the fluorosurfactant.

* * * * *